United States Patent
Lin

[19]

[11] Patent Number: 5,472,133
[45] Date of Patent: Dec. 5, 1995

[54] SOLDERING IRON RACK WITH A POWER SAVING CONTROL

[75] Inventor: C. C. Lin, Taipei, Taiwan

[73] Assignee: Chang Jun Technology Co., Ltd., Taipei, Taiwan

[21] Appl. No.: 283,865

[22] Filed: Aug. 1, 1994

[51] Int. Cl.⁶ ............................................. B23K 3/00
[52] U.S. Cl. ......................... 228/8; 228/51; 228/56.5; 219/242
[58] Field of Search ............................. 228/8, 51, 56.5, 228/59, 102; 219/240, 241, 242

[56] References Cited

U.S. PATENT DOCUMENTS

| | | | |
|---|---|---|---|
| 3,705,680 | 12/1972 | Siegel | 228/51 |
| 3,946,196 | 3/1976 | Waters et al. | 219/242 |
| 3,990,623 | 11/1976 | Fortune | 228/57 |
| 5,090,649 | 2/1992 | Tipp | 219/242 |

FOREIGN PATENT DOCUMENTS 254381 10/1989 Japan .................................. 219/241

OTHER PUBLICATIONS

Electric Soldering Iron Co., Inc. "Thermostatic Control Stand", copyright 1938.
Hexacon Electric Company, "Micro—Soldering Station", Apr. 1971.

*Primary Examiner*—Samuel M. Heinrich
*Attorney, Agent, or Firm*—Lowe, Price, LeBlanc & Becker

[57] ABSTRACT

A soldering iron rack including a base having an upright support, an electric soldering iron, a holder mounted on the upright support and having a heat-insulative barrel on the inside for holding the electric soldering iron, and a control circuit to detect the temperature of the electric soldering iron when the electric soldering iron is put in the holder so as to cut off power supply from the electric soldering iron when its temperature surpasses the predetermined upper limit value or to heat the electric soldering iron when its temperature drops below the predetermined lower limit value.

4 Claims, 3 Drawing Sheets

SOLDERING IRON RACK WITH A POWER SAVING CONTROL

BACKGROUND OF THE INVENTION

The present invention relates to a soldering iron rack for holding an electric soldering iron, and relates more particularly to such a soldering iron rack which keeps the electric soldering iron within a predetermined temperature range when the electric soldering iron is rested during a soldering work.

Various soldering iron racks have been disclosed for holding or hanging electric soldering irons during an interruption while working. These soldering iron racks do not control power supply. Because an electric soldering iron is maintained electrically connected while working, much power supply is wasted during interruptions.

SUMMARY OF THE INVENTION

The present invention has been accomplished to eliminate the aforesaid problem. It is therefore the principal object of the present invention to provide a soldering iron rack which automatically cuts off power supply from the electric soldering iron when the electric soldering iron is rested and its temperature surpasses a predetermined value. Therefore, power supply can be greatly saved, and the service life of the electric soldering iron can be prolonged. According to one aspect of the present invention, the soldering iron rack comprises a base having an upright support, an electric soldering iron, a holder mounted on the upright support and having a heat-insulative barrel on the inside for holding the electric soldering iron, and a control circuit to detect the temperature of the electric soldering iron when the electric soldering iron is put in the holder so as to cut off power supply from the electric soldering iron when its temperature surpasses the predetermined upper limit value or to heat the electric soldering iron when its temperature drops below the predetermined lower limit value. According to another aspect of the present invention, a green indicator light is provided and turned on to shown the stand-by mode when power supply is cut off from the electric soldering iron, and a red color indicator lamp is provided an turned on to show the heating mode when the electric soldering iron is heated.

DETAILED DESCRIPTION OF THE PREFERRED EMBODIMENT

Figure 1:
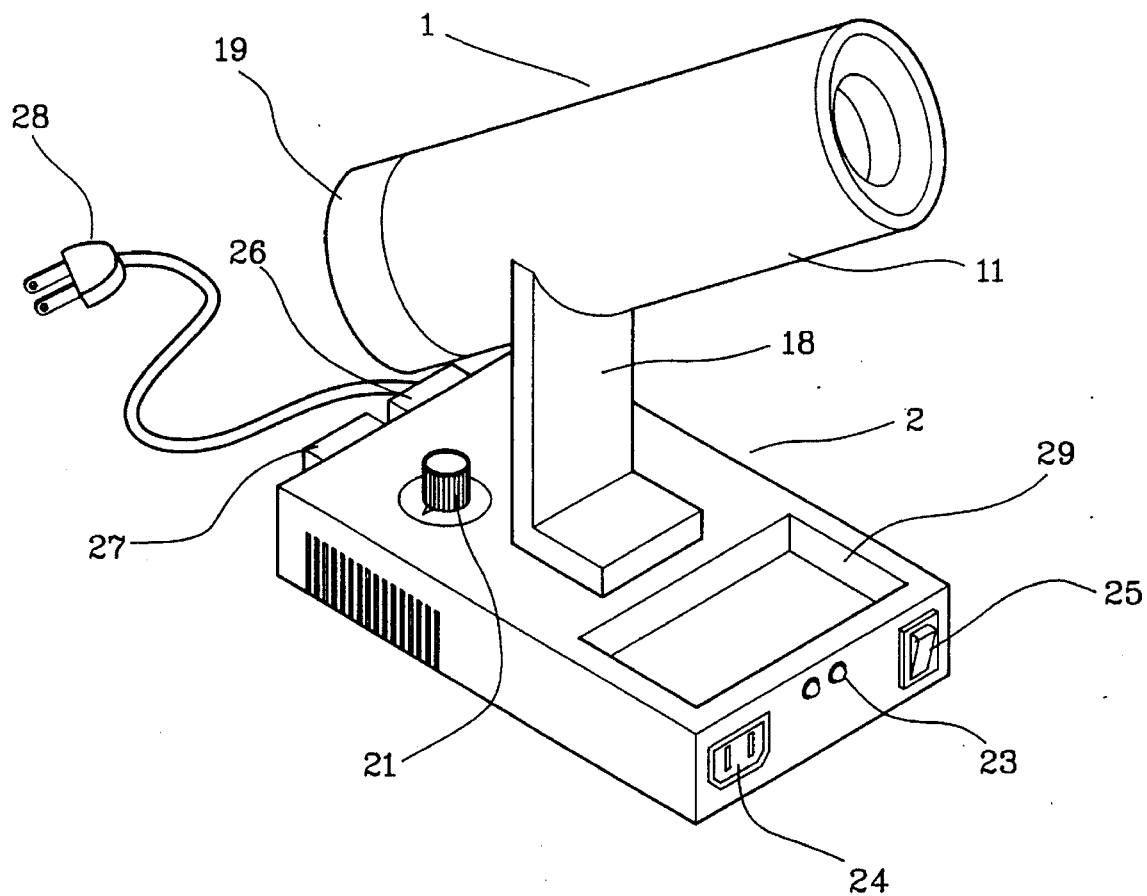
FIG. 1 is an elevational view of a soldering iron rack according to the preferred embodiment of the present invention.
Figure 2:
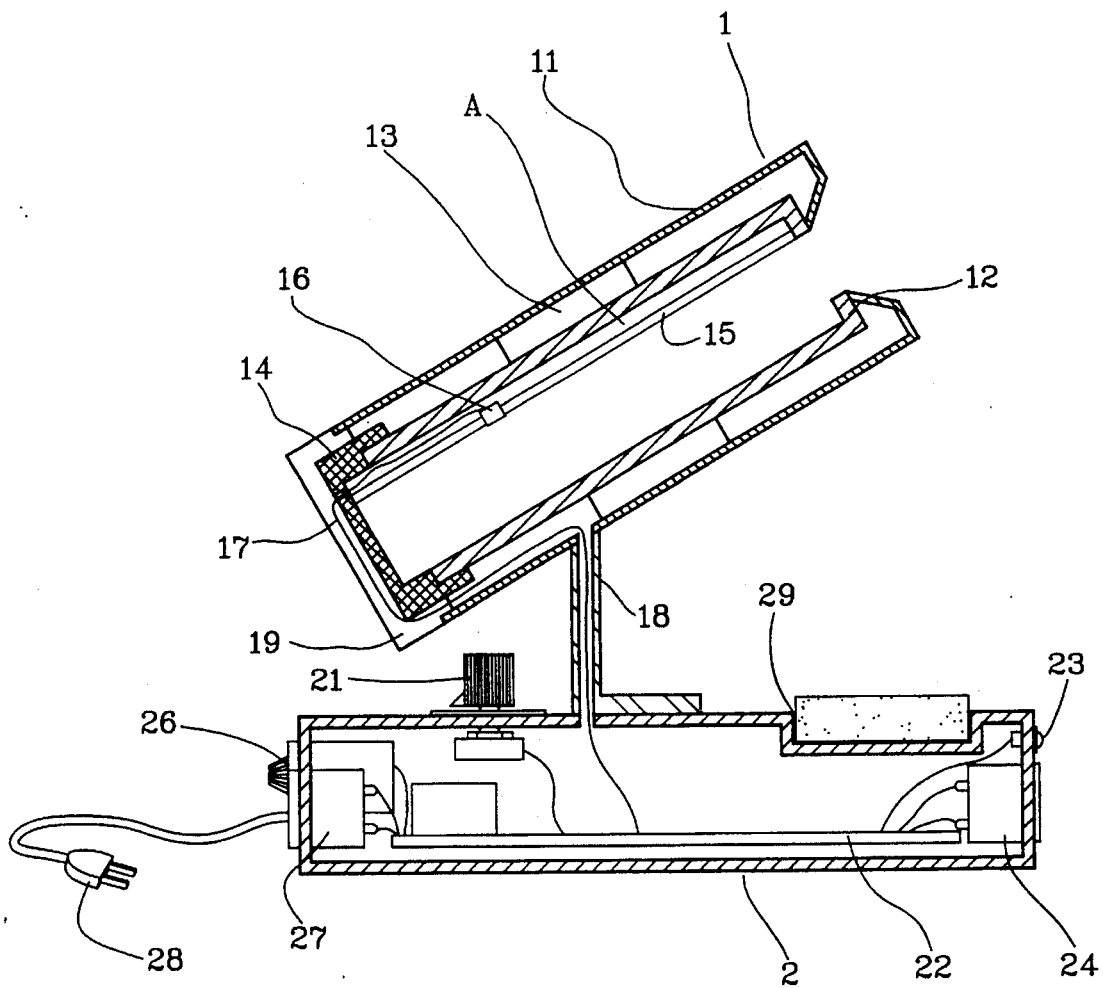
FIG. 2 is a sectional elevation of the soldering iron rack shown in FIG. 1.
Figure 3:
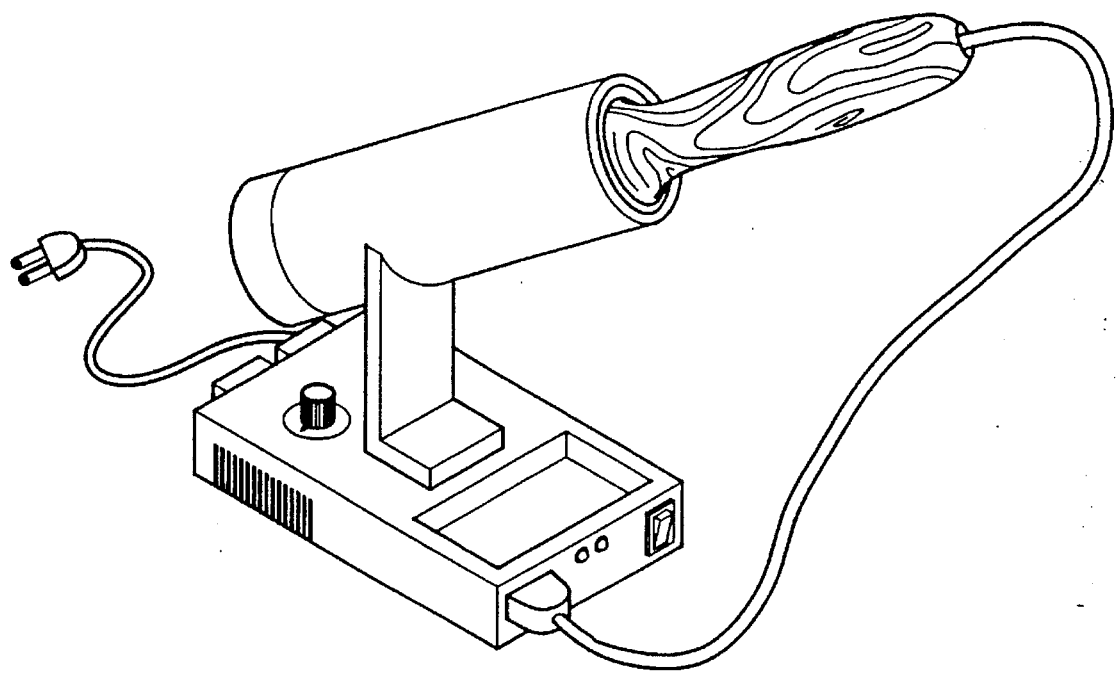
FIG. 3 shows a soldering iron mounted on the soldering iron rack of FIG. 1.

Referring to FIGS. 1, 2, and 3, a soldering iron rack in accordance with the present invention is generally comprised of a base 2, and a holder 1 supported on an upright support 18 above the base 2.

The holder 1 comprises a cylindrical heat-resisting casing 11, a heat-insulative barrel 12 longitudinally received inside the heat-resisting casing 11, and a locating spring 13 supported between the heat-resisting casing 11 and the heat-insulating barrel 12. The locating spring 13 holds the heat-insulative barrel 12 inside the heat-resisting casing 11 and keeps the heat-insulative barrel 12 spaced from the heat resisting casing 11 to prevent direct transmitting of heat from the heat-insulative barrel 12 to the heat-resisting casing 11. The heat-insulative barrel 12 has a rear end covered with an end cap 14. The end cap 14 has an elongated heat-insulative flange 15 perpendicularly extended from the inside near the periphery and mounted with a thermodetector 16. When the end cap 14 is fastened to the heat-insulative barrel 12, the heat-insulative flange 15 is inserted into the heat-insulative barrel 12, and therefore a heat-insulative space A is defined between the heat-insulative flange 15 and the inside wall of the heat-insulative barrel 12 for holding the signal line 17 of the thermodetector 16. The signal line 17 has one end connected to the thermodetector 16, and an opposite end extended out of the end cap 14 then inserted through the upright support 18 and then connected to a control circuit board 22 inside the base 2. A heat-resisting end cap 19 is covered on the rear end of the heat-resisting casing 11 over the end cap 14 of the heat-insulative barrel 12.

The base 2 comprises a regulator 21 at the top for controlling the temperature range of the electric soldering iron being connected. The control circuit board 2 receives the detected signal from the thermodetector 16 and then compares the detected signal with the reference signal obtained from the regulator 21 so as to determine if to heat the electric soldering iron. When the control circuit board 22 makes a decision to heat the electric soldering iron, it immediately gives a signal to LED indicator light set 23, which is mounted on the base 2 at one side, causing the LED indicator light set 23 to give light. The base 2 further comprises a power switch 25, a power outlet socket 24 connected to the control circuit board 22 and controlled by the power switch 25 for the connection of the electric soldering iron electrically, a power input connector 27 connected to the control circuit board 22, a fuse 26, a power cord 28 connected to the power input connector 27 through the fuse 26 for connection to a city power supply outlet, and a recess 29 at the top for holding a sponge.

When in use, the user can set the upper and lower limits of the temperature of the electric soldering iron through the regulator 21. When the electric soldering iron is held in the heat-insulative barrel 12 of the holder 1 during an interruption while working, the thermodetector 16 detects the temperature of the electric soldering iron. If the temperature of the electric soldering iron surpasses the set upper limit, the control circuit board 22 will automatically cut off power supply from the electric soldering iron (at the same time, the green LED indicator light is turned on to show the stand-by-by mode). If the temperature of the electric soldering iron drops below the set lower limit, the control circuit board 22 will automatically turn on power supply causing the electric soldering iron heated (at the same time, the red LED indicator light is turned on to show the heading mode). When the electric soldering iron is removed from the holder 1 for a soldering work, the temperature inside the heat-insulative barrel 12 is maintained at a low level, and therefore the electric soldering iron is maintained heated. Because the electric soldering iron is held in the heat-insulative barrel 12 within the heat-resisting casing 11 during an interruption, heat will not escape out of the holder 1 quickly, and therefore the electric soldering iron can be rapidly heated to the desired temperature without wasting much power supply.

What is claimed is:

1. A soldering iron rack comprising:

a base having an upright support, and a top recess for holding a sponge;

an electric soldering iron;

a holder mounted on said upright support for holding said electric soldering iron, said holder comprising a cylindrical heat-resisting casing and a heat-insulative barrel longitudinally received inside said heat-resisting casing for holding said electric soldering iron when said electric soldering iron is not operated;

a thermodetector disposed inside said heat-insulative barrel to detect the temperature of said electric soldering iron when said electric soldering iron is put in said heat-insulative barrel; and a control circuit to receive the detected temperature signal from said thermodetector by a signal line so as to cut off power supply from said electric soldering iron when the detected temperature signal surpass a predetermined upper limit value or turn on power supply to said electric soldering iron when the detected temperature signal drops below a predetermined lower limit value.

2. The soldering iron rack of claim 1 wherein said holder comprises a cylindrical heat-resisting casing having a front end open and a rear end covered with an end cap, a heat-insulative barrel longitudinally concentrically suspended within said heat-resisting casing by spring means and having a front end open and a rear end covered with an end cap, the end cap of said heat-insulative barrel having a heat-insulative flange extended into said heat-insulative barrel to hold said thermodetector inside said heat-insulative barrel.

3. The soldering iron rack of claim 2 wherein said heat-insulative flange defines with the inside wall of said heat-insulative barrel a heat-insulative space, through which said signal line passes.

4. The soldering iron rack of claim 1 wherein said control circuit comprises a regulator for setting the upper and lower limits of the temperature of said electric soldering iron, a power switch, a power outlet controlled by said power switch to provide power supply to said electric soldering iron, a power indicator lamp, which turns on when said power switch is switched on, a heating indicator lamp, which turns on when said electric soldering iron is heated, fuse means, and a power input connected to AC power supply through said fuse means.

\* \* \* \* \*